United States Patent
Tokunaga et al.

(10) Patent No.: US 6,496,395 B2
(45) Date of Patent: Dec. 17, 2002

(54) DIRECT-CURRENT POWER-SUPPLY APPARATUS, CONTROL CIRCUIT THEREOF AND SEMICONDUCTOR INTEGRATED CIRCUIT DEVICE FOR POWER SUPPLY

(75) Inventors: Norikazu Tokunaga, Hitachi (JP); Kenichi Onda, Hitachi (JP); Tadashi Takahashi, Hitachi (JP); Takeshi Onaka, Hitachi (JP); Ryohei Saga, Takasaki (JP); Katsunori Hayashi, Odawara (JP)

(73) Assignees: Hitachi Ltd., Tokyo (JP); Hitachi Tohbu Semiconductor Ltd., Takasaki (JP)

( * ) Notice: Subject to any disclaimer, the term of this patent is extended or adjusted under 35 U.S.C. 154(b) by 0 days.

(21) Appl. No.: 09/809,997

(22) Filed: Mar. 14, 2001

(65) Prior Publication Data

US 2001/0026462 A1 Oct. 4, 2001

(30) Foreign Application Priority Data

Mar. 29, 2000 (JP) ............................... 2000-095220

(51) Int. Cl.[7] ................................. H02M 3/24
(52) U.S. Cl. ...................... 363/97; 363/21.06
(58) Field of Search .......................... 363/97, 127, 89, 363/81, 84, 131, 98, 21.06, 21.07

(56) References Cited

U.S. PATENT DOCUMENTS 5,528,480 A * 6/1996 Kikinis et al. ............. 363/15
6,184,660 B1 * 2/2001 Hatular ...................... 320/141

* cited by examiner

*Primary Examiner*—Rajnikant B. Patel
(74) *Attorney, Agent, or Firm*—Hogan & Hartson, LLP

(57) ABSTRACT

A direct-current power-supply apparatus provided by the present invention comprises a switching converter for converting an input direct-current power into another direct-current power, a control circuit and an isolation means. The switching converter has a main switch device for generating a pulse voltage from the direct-current input, a synchronous-rectification circuit on the output side of the switching converter and a reverse-current-blocking switch. On the other hand, the control circuit includes a PWM formation unit for driving the main switch device, a synchronous-rectification control unit for controlling an operation to drive the synchronous-rectification circuit and a driving control unit for controlling an operation to drive the reverse-current-blocking switch. The control circuit operates by using a common electric potential appearing on the output side of the switching converter as a reference electric potential. A driving signal is applied to the main switch device through the isolation means. Thus, the direct-current power-supply apparatus is controlled without need for exchanges of the signal for driving the main switch device and a signal isolated between control devices including a switch for synchronous rectification.

16 Claims, 12 Drawing Sheets

F I G. 12
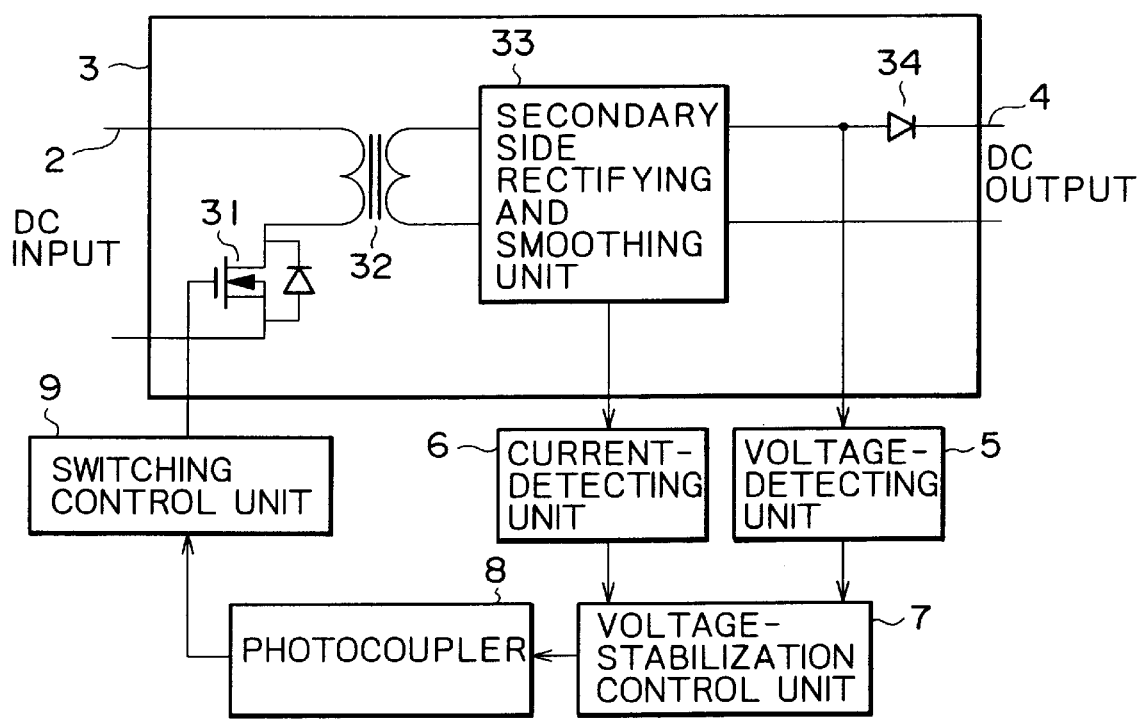

DIRECT-CURRENT POWER-SUPPLY APPARATUS, CONTROL CIRCUIT THEREOF AND SEMICONDUCTOR INTEGRATED CIRCUIT DEVICE FOR POWER SUPPLY

BACKGROUND OF THE INVENTION

A plurality of switching converters are used as a power supply of typically a disk array apparatus consuming a relatively large current. The switching converters are each used as a direct-current power supply and connected to each other in parallel to supply a voltage of several volts. It is necessary to efficiently control a load borne by each of the switching converters connected in parallel to constitute the power supply. The switching converter serving as such a direct-current power supply is disclosed in Japanese Patent Laid-open Nos. Hei 9-93929/1997 and Hei 9-233816/1997.

FIG. 12 is a diagram showing the configuration of a direct-current power supply based on the prior art. In the figure, reference numerals 2 and 3 denote a DC input and a switching converter (or a DC/DC converter) respectively. Reference numeral 31 denotes a main switch device, reference numeral 32 denotes a transformer and reference numeral 33 denotes a rectifying/smoothing circuit provided on the secondary side of the transformer 32. Reference numerals 34 and 4 denotes a diode and a DC output voltage respectively. Reference numeral 5 denotes a voltage-detecting unit for detecting the DC output voltage 4. Reference numeral 6 denotes a current-detecting unit for detecting an output current and reference numeral 7 denotes a voltage-stabilization control unit. Reference numerals 8 and 9 denote a photocoupler and a switching control unit respectively.

As shown in FIG. 12, the voltage-detecting unit 5, the current-detecting unit 6 and the voltage-stabilization control unit 7 are provided on the output-potential side of the switching converter 3. A control signal generated by the voltage-stabilization control unit 7 is supplied to the switching control unit 9 provided on the input-potential side of the switching converter 3 by way of the photocoupler 8. The switching control unit 9 controls the main switch device 31 by using the control signal supplied through the photocoupler 8 serving as an isolator. The switching control unit 9 controls the main switch device 31 to adjust the DC output voltage 4 of the switching converter 3 and, hence, the load borne thereby.

In the direct-current power-supply apparatus shown in FIG. 12, the propagation speed of the control signal is determined by the propagation speed of the isolation means such as the photocoupler 8. Thus, the control signal cannot be transmitted at a high speed, resulting in a poor response characteristic of the direct-current power-supply apparatus. Furthermore, in order to improve the efficiency of the switching converter 3, the direct-current power-supply apparatus employs a synchronous-rectification circuit and/or a reverse-current-blocking switch to live or not to live a line. In this case, it is necessary to provide a circuit for controlling the synchronous-rectification circuit and/or the reverse-current-blocking switch. Since such a control circuit operates with a reference electric potential supplied by way of a signal-isolating means as a separate electric potential, however, improvement of the response characteristic of the direct-current power-supply apparatus cannot be expected. In addition, since there is also required a multi-function control circuit operating with a reference electric potential supplied as a separate electric potential, reduction of the size and the cost of the direct-current power-supply apparatus cannot be expected either.

SUMMARY OF THE INVENTION

A direct-current power-supply apparatus provided by the present invention comprises a switching converter for converting an input direct-current power into another direct-current power, a control circuit and an isolation means. The switching converter has a main switch device for generating a pulse voltage from the direct-current input, a synchronous-rectification circuit on the output side of the switching converter and a reverse-current-blocking switch. On the other hand, the control circuit employed in the direct-current power-supply apparatus comprises a PWM formation unit, a synchronous-rectification control unit and a driving control unit. The PWM formation unit is a unit for driving the main switch device. The synchronous-rectification control unit is a unit for controlling an operation to drive the synchronous-rectification circuit. The driving control unit is a unit for controlling an operation to drive the reverse-current-blocking switch. The control circuit operates by using an electric potential appearing on the output side of the switching converter as a reference electric potential.

The direct-current power-supply apparatus provided by the present invention applies a driving signal to the main switch device through the isolation means. The direct-current power-supply apparatus provided by the present invention is capable of executing control without exchanging the signal for driving the main switch device and a signal isolated between control devices including a switch for synchronous rectification.

BRIEF DESCRIPTION OF THE DRAWINGS

FIG. 12 is a diagram showing the conventional direct-current power-supply apparatus.

PREFERRED EMBODIMENTS OF THE INVENTION

Figure 1:
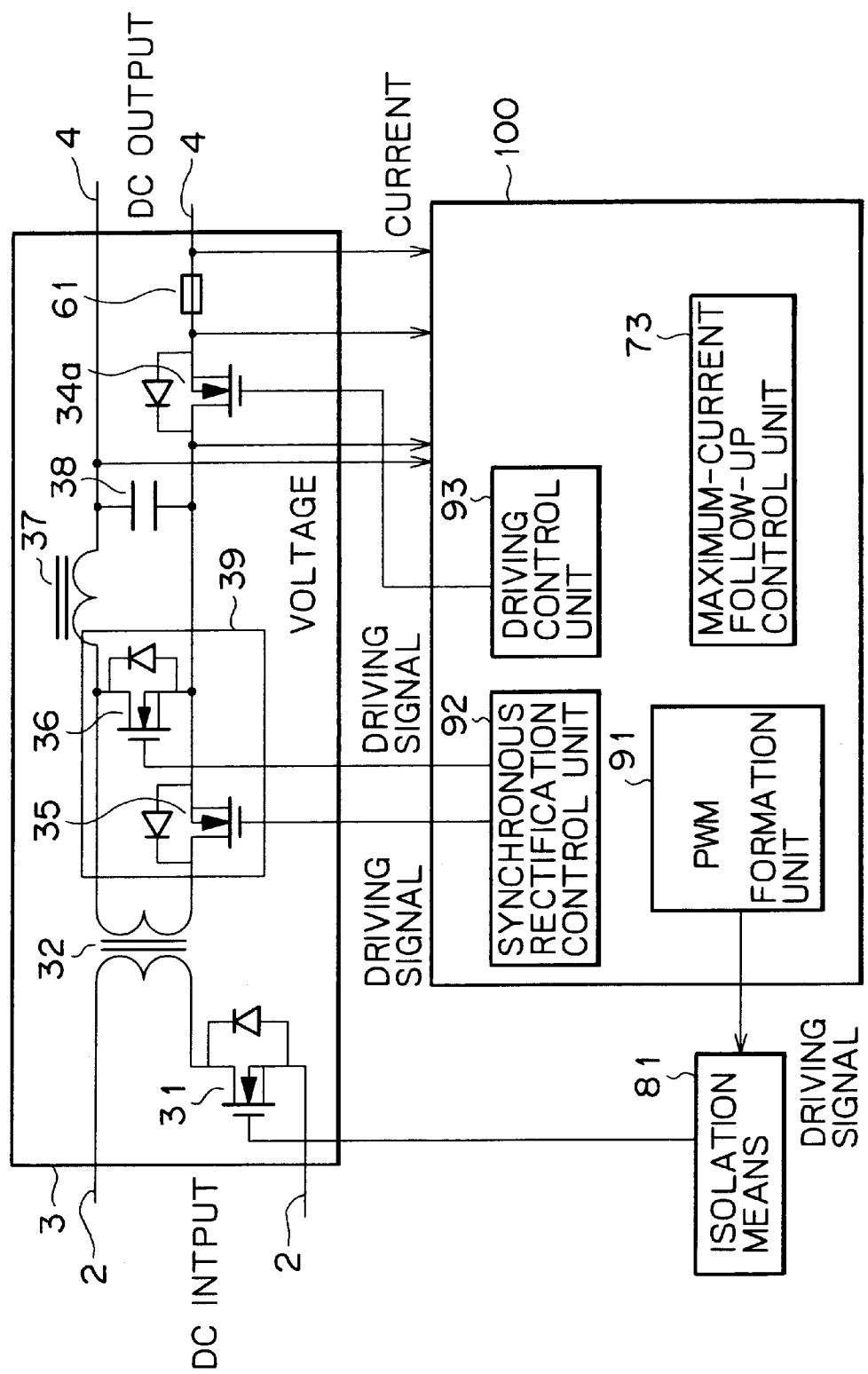
FIG. 1 is a diagram showing the basic configuration of the present invention.

FIG. 1 is a diagram showing the basic configuration of a direct-current power-supply apparatus provided by the present invention. In FIG. 1, reference numerals 2 and 3 denote a DC input and a switching converter respectively.

Reference numeral 4 denotes a DC output and reference numeral 100 denotes a control circuit. Reference numeral 81 denotes a signal-isolating means. The control circuit 100 has a configuration composed of components having functions to be described later. Control units employed in the control circuit 100 use the same electric potential as a reference electric potential.

In the typical configuration shown in FIG. 1, an electric potential appearing at an output terminal of the switching converter 3 is used as the reference electric potential. The switching converter 3 comprises a main switch device 31, a transformer 32, a rectification switch device 35, a synchronous-rectification circuit 39 using a current-circulation switch 36, a smoothing reactor 37, a smoothing capacitor 38, a reverse-current-blocking device 34a and a current-detecting device 61. The switching converter 3 supplies an output voltage and an output current to the control circuit 100 as input signals. The control circuit 100 comprises a maximum-current follow-up control unit 73, a PWM formation unit 91, a synchronous-rectification control unit 92 and a driving control unit 93. In accordance with the output voltage and the output current supplied by the switching converter 3 as input signals to the control circuit 100, the maximum-current follow-up unit 73 controls the main switch device 31, the rectification switch device 35, the current-circulation switch 36 and the reverse-current-blocking device 34a to generate a predetermined output voltage, supplying a stable direct-current power to a load not shown in the figure.

As shown in FIG. 1, in the direct-current power-supply apparatus provided by the present invention, the control circuit components such as the main switch device 31, the rectification device 35 and the current-circulation switch 36 are provided on the output-terminal-potential side of the switching converter 3. Thus, control can be executed at a high speed without propagating a control signal through a signal-isolating means such as a photocoupler between circuits for controlling the main switch device 31 and a synchronous-rectification switch. It should be noted that, while the reverse-current-blocking switch device 34a is provided on the low-potential side of the output terminal in the embodiment shown in FIG. 1, the reverse-current-blocking switch device 34a can also be provided on the high-potential side.

First Embodiment

Figure 2:
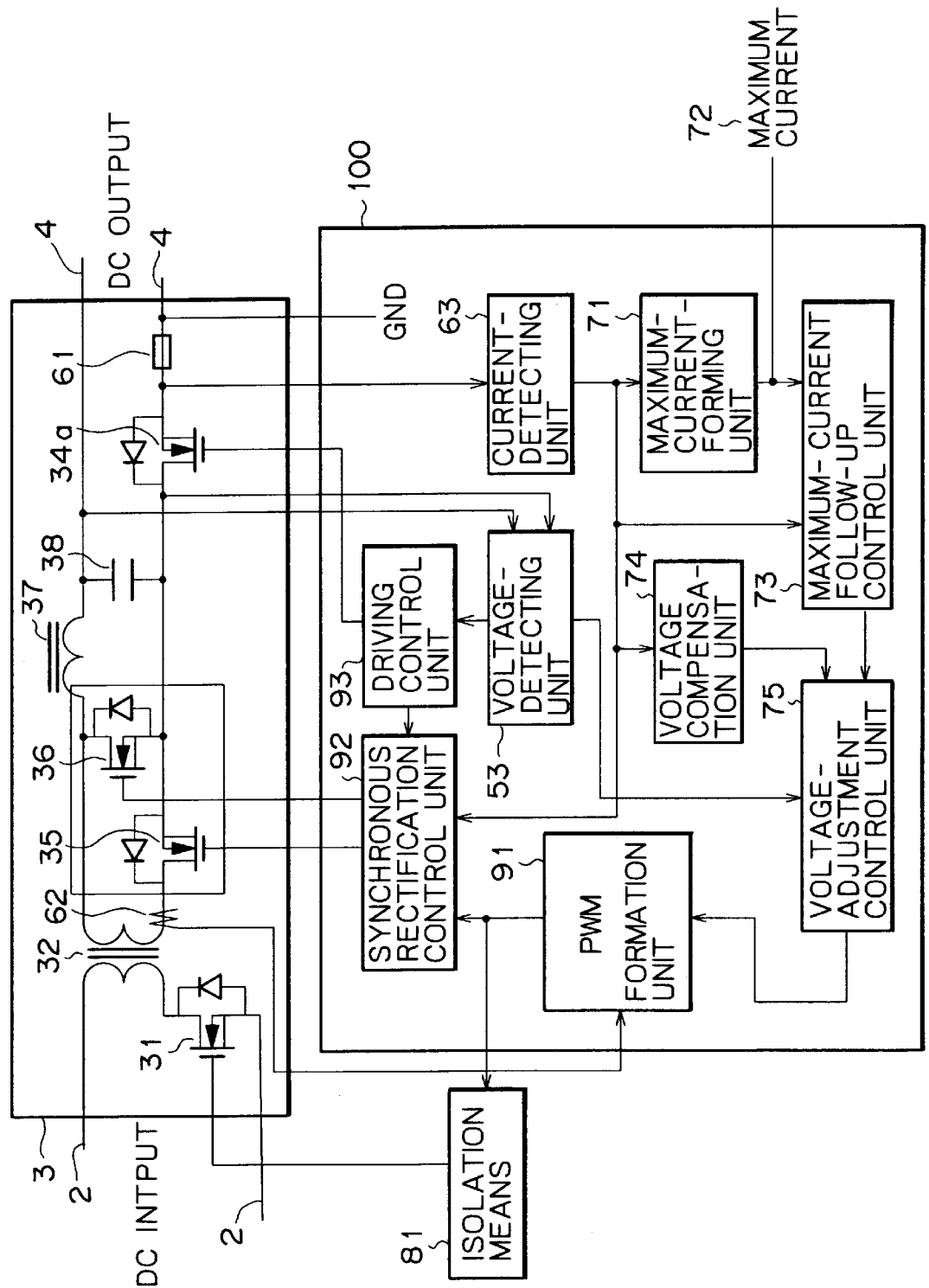
FIG. 2 is a diagram showing a first embodiment of the present invention.

FIG. 2 is a diagram showing a first embodiment of the present invention. Circuit components of FIG. 2, which are identical with those employed in the direct-current power-supply apparatus shown in FIG. 1, are denoted by the same reference numerals as the latter. In FIG. 2, reference numerals 53 and 63 denote a voltage-detecting unit and a current-detecting unit respectively. Reference numerals 71 and 72 denote a maximum-current-forming unit and a maximum-current signal line respectively. Reference numerals 74 and 75 denote a voltage compensation unit and a voltage-adjustment control unit respectively. The voltage-detecting unit 53, the current-detecting unit 63, the maximum-current-forming unit 71, the maximum-current signal line 72, the voltage compensation unit 74 and the voltage-adjustment control unit 75 operate at the same reference electric potential. Reference numeral 62 shown in FIG. 2 denotes a current detector.

In this embodiment, the low electric potential at the output of the switching converter 3 is used as a common potential GND. A detection signal output by a current-detecting device 61 is supplied to the current-detecting unit 63. An output electric potential appearing on the positive-polarity side of the capacitor 38 and an electric potential appearing on the drain side of the reverse-current-blocking switch device 34a are supplied to the voltage-detecting unit 53. A detection signal output by the current detector 62 is supplied to a PWM formation unit 91.

The current-detecting unit 63 changes the level of a detected current and supplies an output thereof to the maximum-current-forming unit 71, the voltage compensation unit 74 and a synchronous-rectification control unit 92. The maximum-current-forming unit 71 bears a maximum current as its share, outputting a current signal of the switching converter 3 in a parallel operation to the maximum-current signal line 72. A maximum-current follow-up unit 73 drives the voltage-stabilization control unit 75 so that the current output by the switching converter 3 follows the maximum current flowing through the maximum-current signal line 72. The voltage compensation unit 74 is a control circuit for compensating the switching converter 3 for a voltage drop in the switching converter 3 caused by detection currents. The voltage compensation unit 74 controls the voltage-stabilization control unit 75 to compensate the switching converter 3 for the voltage drop. The voltage-detecting unit 53 separates a detected internal voltage inside the switching converter 3 and an applied voltage of the reverse-current-blocking switch device 34a from each other, applying the output voltage thereof to the voltage-stabilization control unit 75 and the voltage applied to the reverse-current-blocking switch device 34a to a driving control unit 93. The voltage-stabilization control unit 75 drives the PWM formation unit 91 to control the main switch device 31 so that a predetermined output voltage is generated and a stable direct-current power is supplied to a load not shown in the figure. In accordance with a signal applied by the voltage-stabilization control unit 75, a current received from the current detector 62 and a signal coming from an oscillator not shown in the figure, the PWM formation unit 91 generates a control signal for driving the main switch device 31. A synchronous-rectification control unit 92 receives the control signal generated by the PWM formation unit 91 for driving the main switch device 31, a signal output by the current-detecting unit 63 and a signal output by the driving control unit 93, generating a signal for driving switch devices 35 and 36 of the synchronous-rectification circuit.

It should be noted that the signal for driving the switch devices 35 and 36 of the synchronous-rectification circuit is generated after the driving of the reverse-current-blocking switch device 34a. The driving control unit 93 receives the voltage applied to the reverse-current-blocking switch device 34a from the voltage-detecting unit 53 and generates a signal for driving the reverse-current-blocking switch device 34a for an applied voltage equal to or lower than a predetermined level. It should be noted the PWM formation unit 91 is also applicable to a control circuit operating in a no-current mode.

In accordance with this embodiment, the control-circuit components such as the main switch device and the synchronous-rectification switch device operate at the same electric potential. Thus, control can be executed at a high speed without need for exchanging an isolated signal among the control-circuit components such as the main switch device and the synchronous-rectification switch device, making it possible for the direct-current power-supply apparatus to display a fast response characteristic. As a result, the direct-current power-supply apparatus has a smaller size, a better efficiency and a lower cost. In addition, since the reverse current of the current-circulation switch 36 can be avoided, the efficiency of the direct-current power-supply apparatus is also improved even for a small load. Furthermore, since the direct-current power-supply apparatus is compensated for a voltage drop in the switching converter caused by detection of currents, the direct-current power-supply apparatus is capable of outputting a voltage with a high degree of precision.

Second Embodiment

Figure 3:
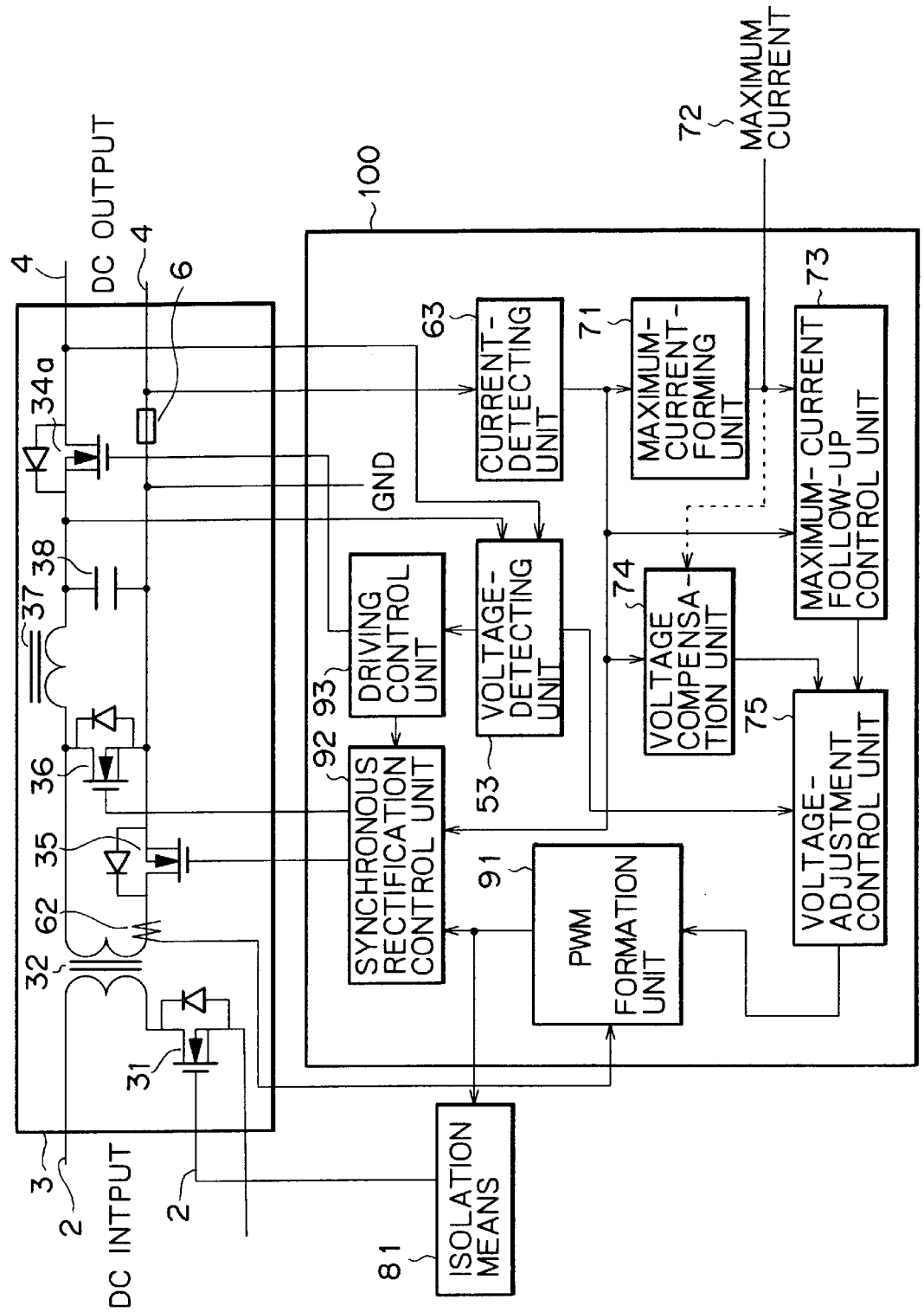
FIG. 3 is a diagram showing a second embodiment of the present invention.

FIG. 3 is a diagram showing a second embodiment of the present invention. The second embodiment is different from the first one in that, in the case of the second embodiment, the reverse-current-blocking switch device 34a is provided on the high-potential side of the output and the common potential GND of the control circuit 100 is provided on the negative-polarity side of the smoothing capacitor 38. It should be noted that, instead of the signal supplied from the current-detecting unit 63, the maximum current on a signal line 72 can also be used as a signal supplied to the voltage compensation unit 74.

In accordance with this embodiment, it is possible to prevent the driving signal of the synchronous-rectification switch device 92 from being superposed on the detection signal generated by the current detector 61. As a result, the output voltage can be controlled at a high speed so that the direct-current power-supply apparatus displays a fast-response characteristic.

Third Embodiment

Figure 4:
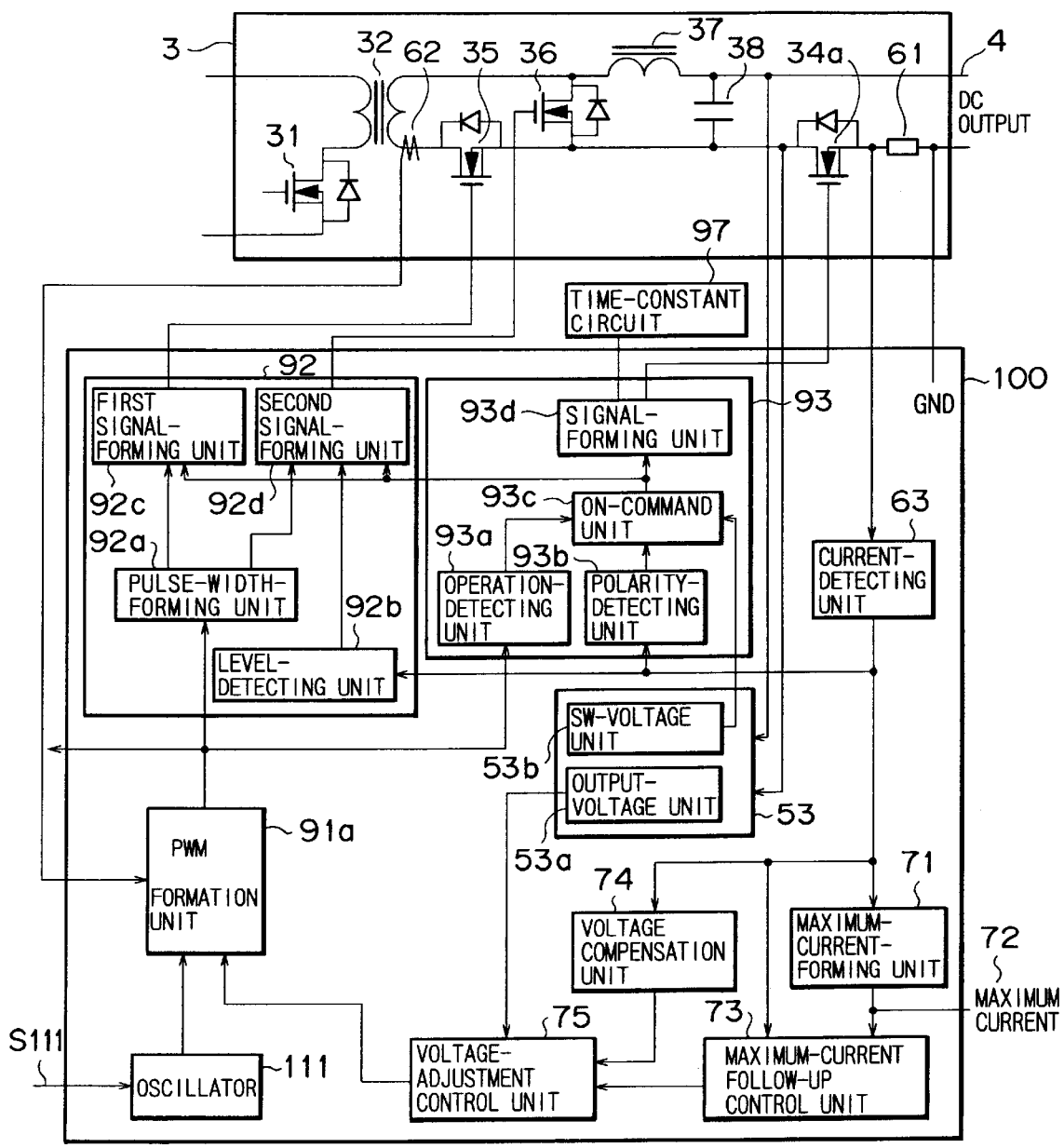
FIG. 4 is a diagram showing a third embodiment of the present invention.

FIG. 4 is a diagram showing a third embodiment of the present invention. The third embodiment is different from the first one in that, in the case of the third embodiment, the configurations of the voltage-detecting unit 53, the synchronous-rectification control unit 92 and the driving control unit 93, which are employed in the control circuit 100, are shown more concretely. In addition, the third embodiment also comprises an oscillator 111 and a time-constant circuit 97, which are newly added to the embodiment. As shown in the figure, the voltage-detecting unit 53 comprises an output-voltage unit 53a and a switch-voltage unit 53b whereas the synchronous-rectification control unit 92 includes a pulse-width-forming unit 92a, a level-detecting unit 92b, a first signal-forming units 92c and a second signal-forming unit 92d. The driving control unit 93 has an operation-detecting unit 93a, a polarity-detecting unit 93b, an on-command unit 93c and a signal-forming unit 93d.

Figure 5:
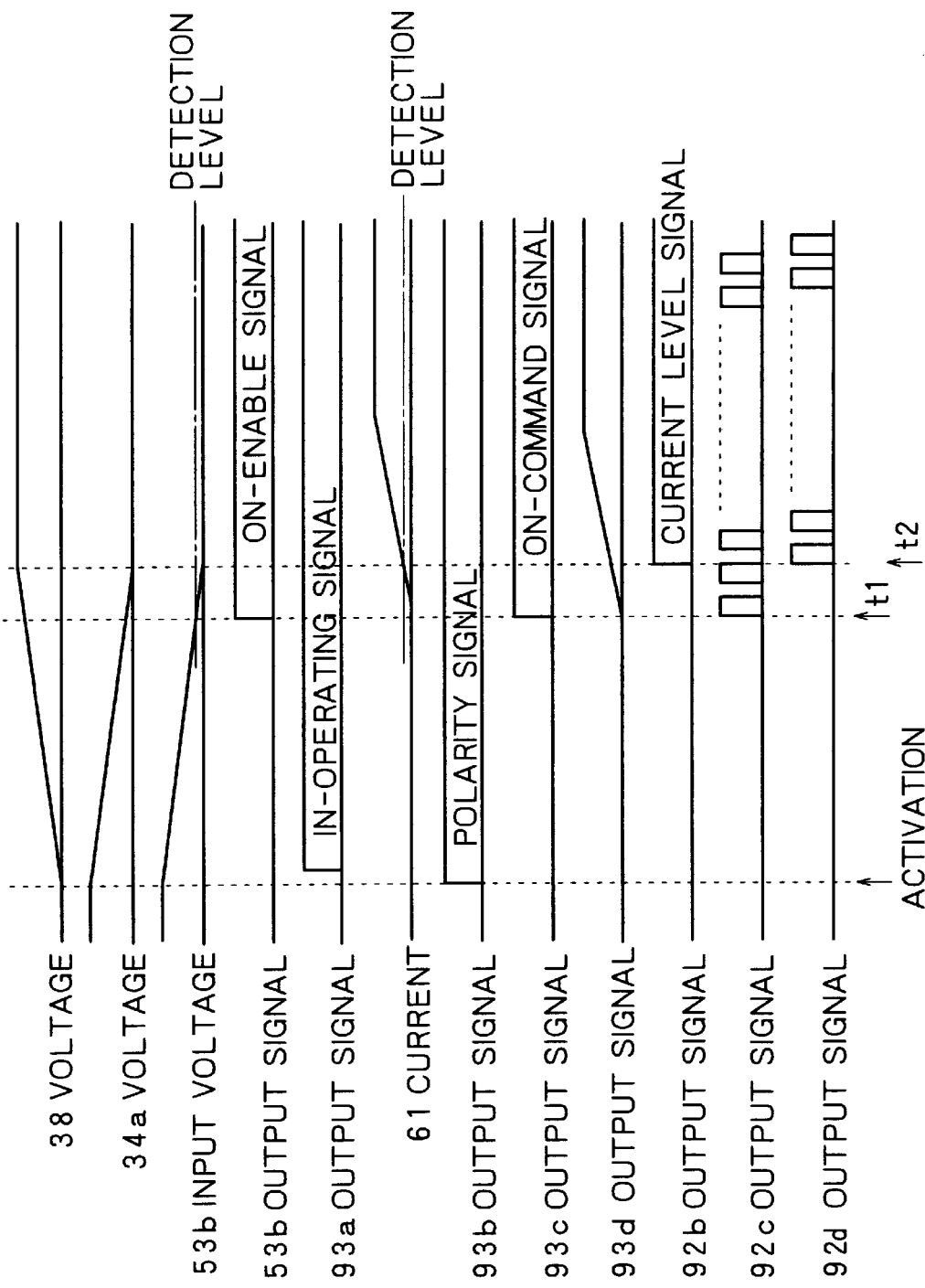
FIG. 5 is a diagram showing operations of the third embodiment of the present invention.
Figure 6:
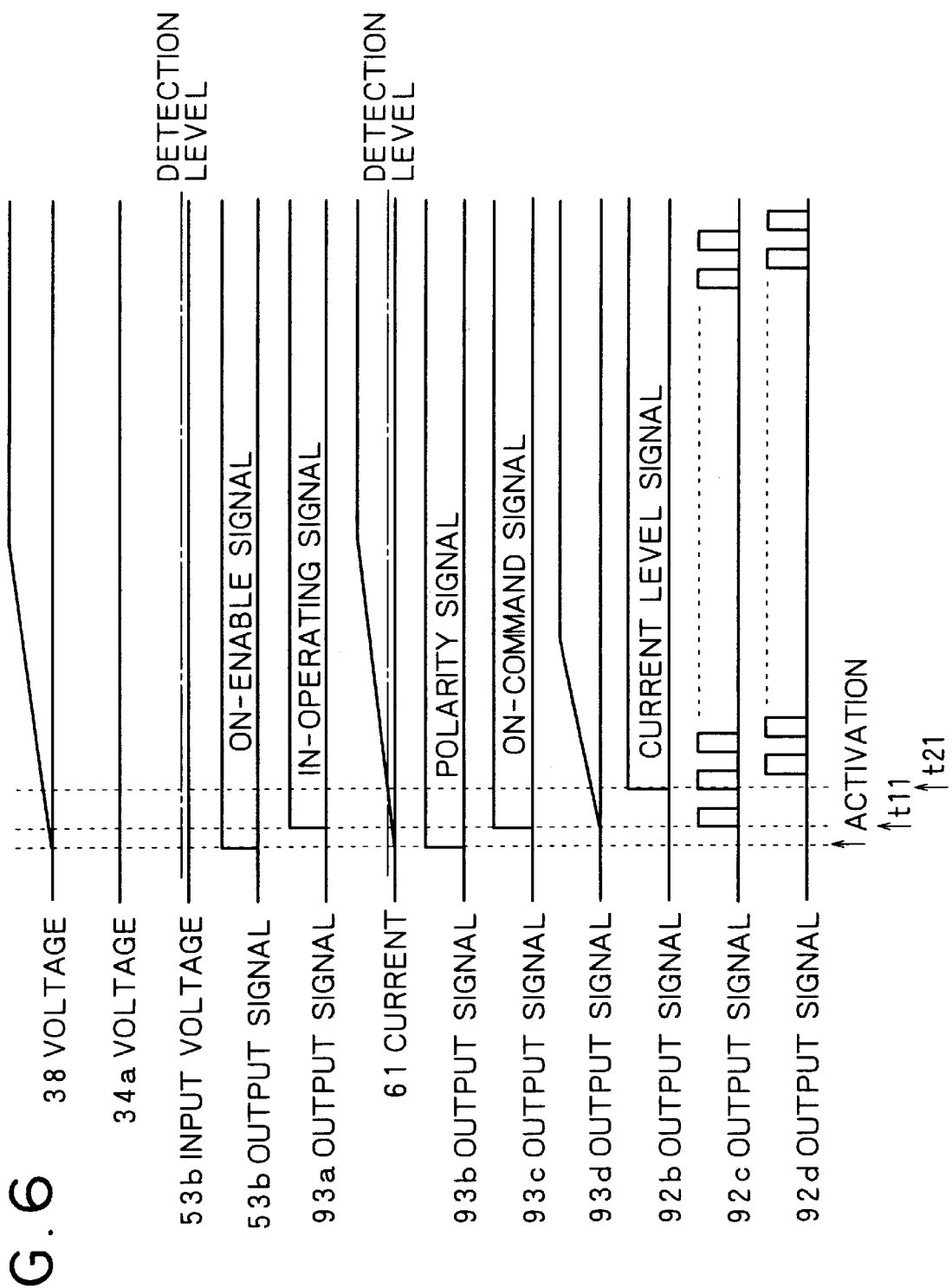
FIG. 6 is a diagram showing other operations of the third embodiment of the present invention.

Operations of circuits employed in the embodiment are explained by referring to FIGS. 5 and 6. FIG. 5 is an explanatory diagram showing activation of the switching converter 3 in a state of load voltages established by other switching converters operating in parallel with this switching converter 3.

After activation, the voltage of the smoothing capacitor 38 gradually increases while the voltage applied to the reverse-current-blocking switch device 34a gradually decreases. The output-voltage unit 53a employed in the voltage-detecting unit 53 separates the voltage of the smoothing capacitor 38 and applies the separated voltage to the voltage-stabilization control unit 75 in order to adjust the output voltage. The voltage of the smoothing capacitor 38 is an internal voltage detected at a location in front of the reverse-current-blocking switch device 34a in the switching converter 3. The switch-voltage unit 53b separates the voltage applied to the reverse-current-blocking switch device 34a as a detected voltage and, at a time t1 the applied voltage goes below a predetermined detection level, the switch-voltage unit 53b generates an on-enable signal and outputs the signal to the on-command unit 93c employed in the driving control unit 93.

The operation-detecting unit 93a employed in the driving control unit 93 detects a normal operating state from a signal output by the PWM formation unit 91a after the activation and then generates a signal indicating the normal operation, outputting the signal to the on-command unit 93c. The polarity-detecting unit 93b receives a detection signal from the current-detecting unit 63 to form a judgment as to whether or not the detected current has a negative polarity. Since a load voltage applied to the reverse-current-blocking switch device 34a is in an off state, a negative-polarity current does not flow. Thus, the polarity-detecting unit 93b outputs a polarity signal that enables the reverse-current-blocking switch device 34a to turn on and applies the signal to the on-command unit 93c.

At the time t1 the signals of the switch-voltage unit 53b, the operation-detecting unit 93a and the polarity-detecting unit 93b are applied, the on-command unit 93c generates an on-command signal and supplies the signal to the signal-forming unit 93d. The signal-forming unit 93d generates a signal with a gradually rising voltage level on the basis of the on-command signal and the time-constant circuit 97 to drive the reverse-current-blocking switch device 34a into an on state gradually.

The pulse-width-forming unit 92a employed in the synchronous-rectification control unit 92 generates a pulse signal of a phase compensating operation with an adjusted deadtime from a pulse signal produced by the PWM formation unit 91a. The pulse-width-forming unit 92a outputs the generated pulse signal to the first signal-forming unit 92c and the second signal-forming unit 92d.

The level-detecting unit 92b forms a judgment as to whether or not the signal output by the current-detecting unit 63 is at least at a detection level. At a time t2 the signal output by the current-detecting unit 63 reaches the detection level, a current-level signal is applied to the second signal-forming unit 92d. The first signal-forming unit 92c applies the pulse signal supplied by the pulse-width-forming unit 92a to the rectification device 35 while the on-command signal of the on-command unit 93c is being applied. On the other hand, the second signal-forming unit 92d applies the pulse signal supplied by the pulse-width-forming unit 92a to the current-circulation switch 36 while the current-level signal of the level-detecting unit 92b and the on-command signal of the on-command unit 93c are being applied.

The oscillator 111 is an oscillator that can be synchronized with a signal S111 applied to the oscillator 111. That is, when the signal S111 is applied to the oscillator 111, the oscillator 111 oscillates at a frequency synchronous to the signal S111. When the signal S111 is not applied to the oscillator 111, on the other hand, the oscillator 111 oscillates at an intrinsic frequency. The frequency of a pulse signal generated by the PWM formation unit 91a is determined by the oscillation frequency of the oscillator 111.

FIG. 6 is an explanatory diagram showing operations after activation of the switching converter 3 with a load voltage unestablihed. After the switching converter 3 is activated, the voltage of the smoothing capacitor 38 gradually rises. Since no reverse voltage is applied to the reverse-current-blocking switch device 34a since the activation time, an output current flows. At a time t11, the polarity-detecting unit 93b generates a signal of an underway operation, driving the reverse-current-blocking switch device 34a through the on-command unit 93c and the signal-forming unit 93d. The polarity-detecting unit 93b also drives the first signal-forming unit 92c through the on-command unit 93c in order to operate the rectification device 35. The output current increases and, when the output current attains a detection level of the level-detecting unit 92b at a time t21, a current-level signal is generated. At that time, the second signal-forming unit 92d is operated to drive the current-circulation switch 36.

It should be noted that the PWM formation unit 91a generates a control signal for driving the main switch device 31 in a current-mode operation in accordance with a signal output by the voltage-stabilization control unit 75, a current obtained from the current detector 62 and a signal generated by an oscillator not shown in the figure.

In accordance with this embodiment, the control-circuit components such as the main switch device and the synchronous-rectification switch device operate at the same reference electric potential. Thus, control can be executed at a high speed without need for exchanging an isolated signal among the control-circuit components such as the main switch device and the synchronous-rectification switch device, making it possible for the direct-current power-supply apparatus to display a fast response characteristic. As a result, the direct-current power-supply apparatus has a smaller size, a better efficiency and a lower cost. In addition, since the synchronous-rectification switch device is driven after the on operation of the reverse-current-blocking switch device 34a, the efficiency is also improved for a small load. Furthermore, since the operation is carried out synchronously with a signal received from an external source, the voltage is output at an even better efficiency.

It should be noted that, even in the configuration of FIG. 3 wherein the locations of the reverse-current-blocking switch device 34a and the common potential GND as well as the current compensation of the voltage compensation unit 74 are different in addition to other differences, the PWM formation unit 91a can also be used in a control circuit not operating in a current mode.

Fourth Embodiment

Figure 7:
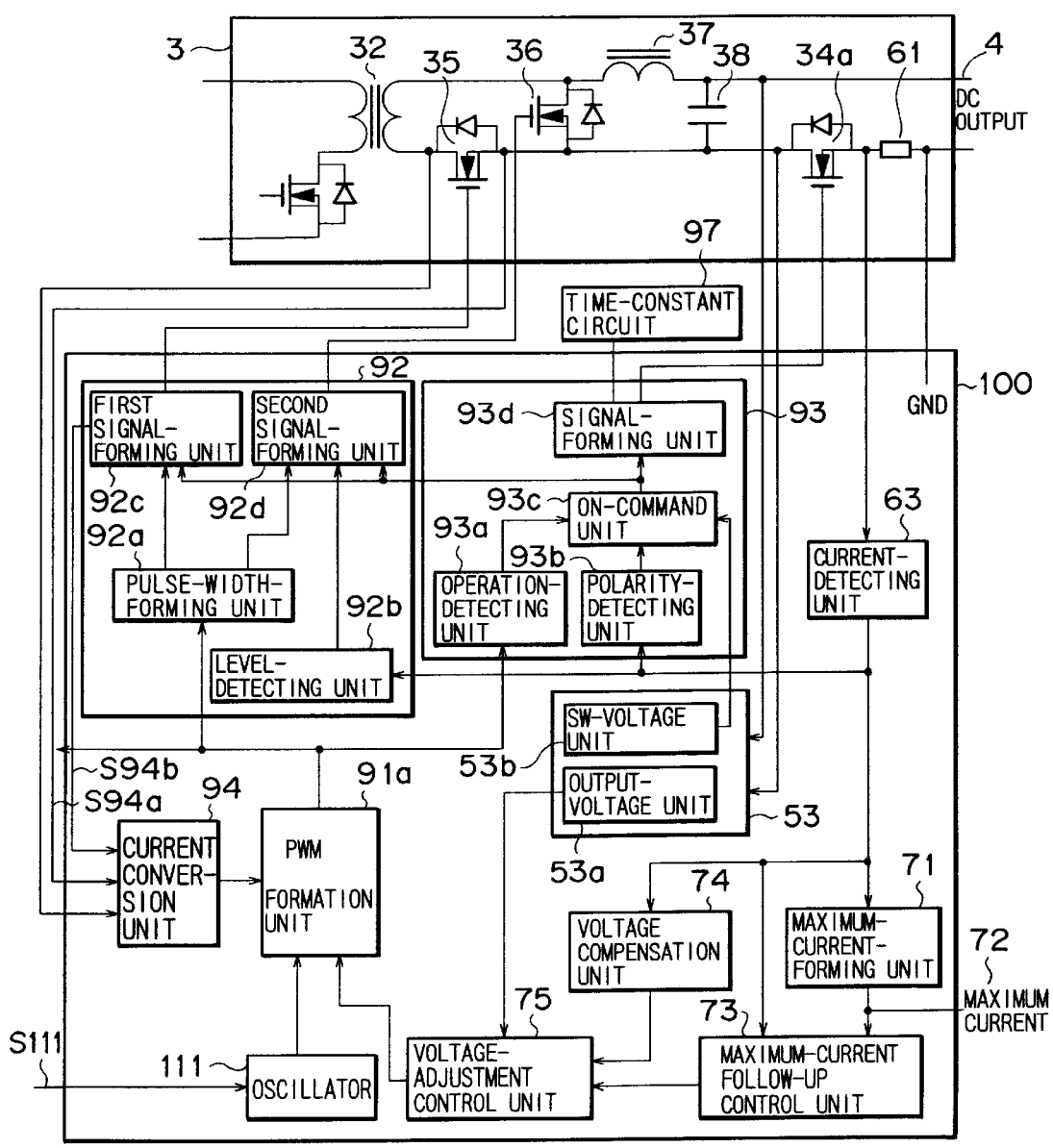
FIG. 7 is a diagram showing a fourth embodiment of the present invention.

FIG. 7 is a diagram showing a fourth embodiment of the present invention. The fourth embodiment is different from the third one in that, in the case of the fourth embodiment, a current conversion unit 94 is employed in the control circuit 100 in place of the current detector 62. The current conversion unit 94 detects the voltage of the rectification device 35 and converts the detected voltage into a signal representing a corresponding current. That is to say, a voltage applied to the rectification device 35 is detected as a voltage signal S94a which is applied to the current conversion unit 94. A pulse signal S94b from the first signal-forming unit 92c employed in the synchronous-rectification control unit 92 is applied to the current conversion unit 94. The pulse signal S94b sets an on state of the rectification device 35. The current conversion unit 94 converts the voltage signal S94a into a current signal during the period of application of the pulse signal S94b. The current conversion unit 94 supplies the current signal to the PWM formation unit 91a a as a current-circulation signal.

In this embodiment, the current detector 62 is not required. It should be noted that the feature of the fourth embodiment is also applicable to the configuration shown in FIG. 3 wherein the locations of the reverse-current-blocking switch device 34a and the common potential GND as well as the current compensation of the voltage compensation unit 74 are different from those of the fourth embodiment in addition to other differences.

Fifth Embodiment

Figure 8:
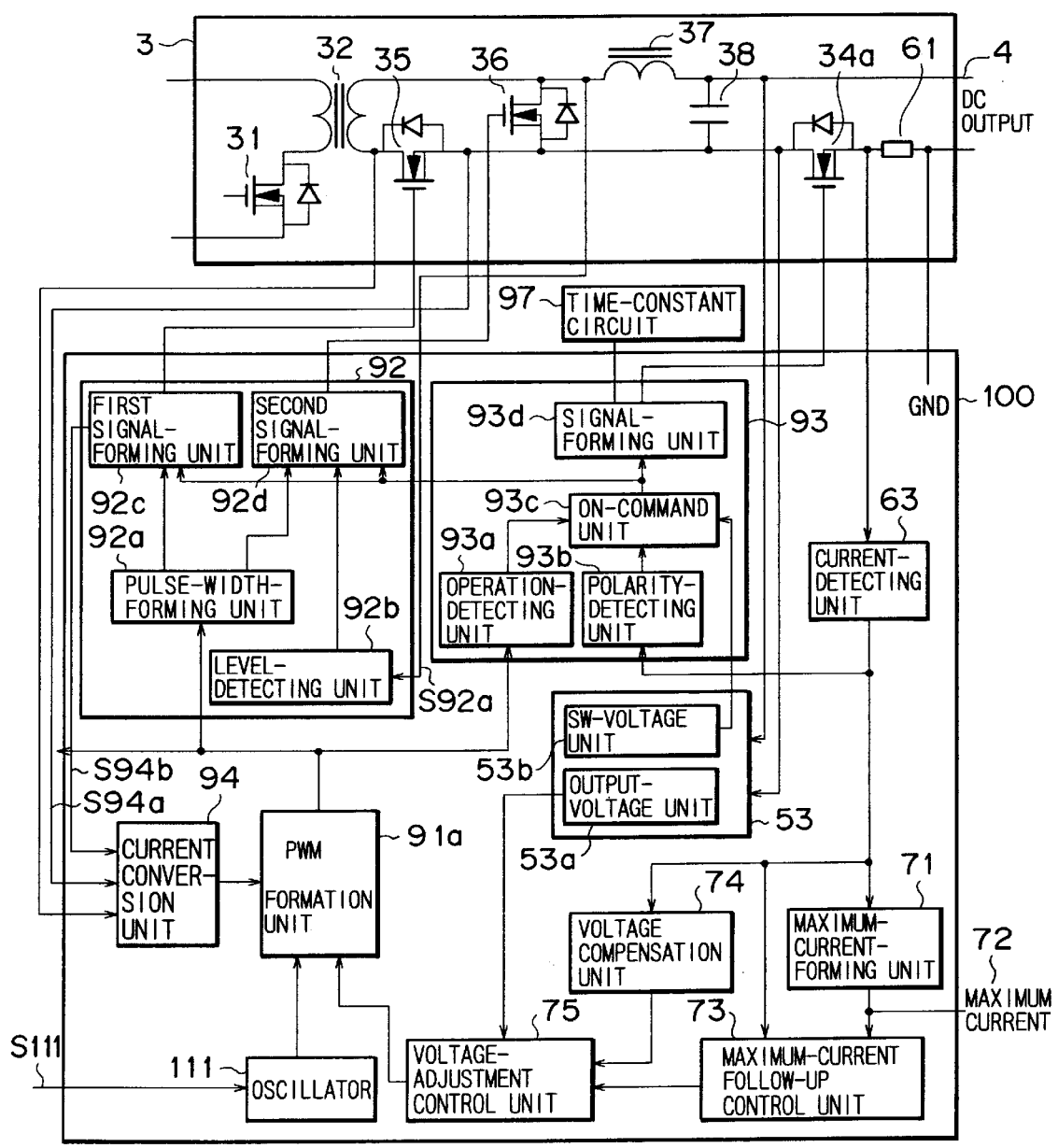
FIG. 8 is a diagram showing a fifth embodiment of the present invention.

FIG. 8 is a diagram showing a fifth embodiment of the present invention. The fifth embodiment is different from the fourth one in that, in the case of the fifth embodiment, the voltage of the current-circulation switch 36 is detected by the synchronous-rectification control unit 92 instead of detecting a signal output by the current-detecting unit 63 employed in the control circuit 100. In order to recognize the polarity and the level of a voltage applied to the current-circulation switch 36, the polarity and the level of a current flowing to the current-circulation switch 36 are directly detected. For this reason, a reverse current flowing to the current-circulation switch 36 is detected and a result of detection is supplied to the signal-forming unit 2. As a result, a reverse current can be prevented from flowing to the current-circulation switch 36.

In accordance with this embodiment, the reverse current of the current-circulation switch 36 can be directly avoided. Thus, the efficiency is improved even for a small load. It should be noted that the voltage of the current-circulation switch 36 is detected and applied to the level-detecting unit 92b instead of detecting a signal output by the current-detecting unit 63, and the operation to drive the current-circulation switch device is controlled in accordance with the detection level. Thus, the PWM formation unit can be used also in a control circuit not operating in a current mode. It should be noted that the feature of the fifth embodiment is also applicable to the configuration shown in FIG. 3 wherein the locations of the reverse-current-blocking switch device 34a and the common potential GND as well as the current compensation of the voltage compensation unit 74 are different from those of the fourth embodiment in addition to other differences.

Sixth Embodiment

Figure 9:
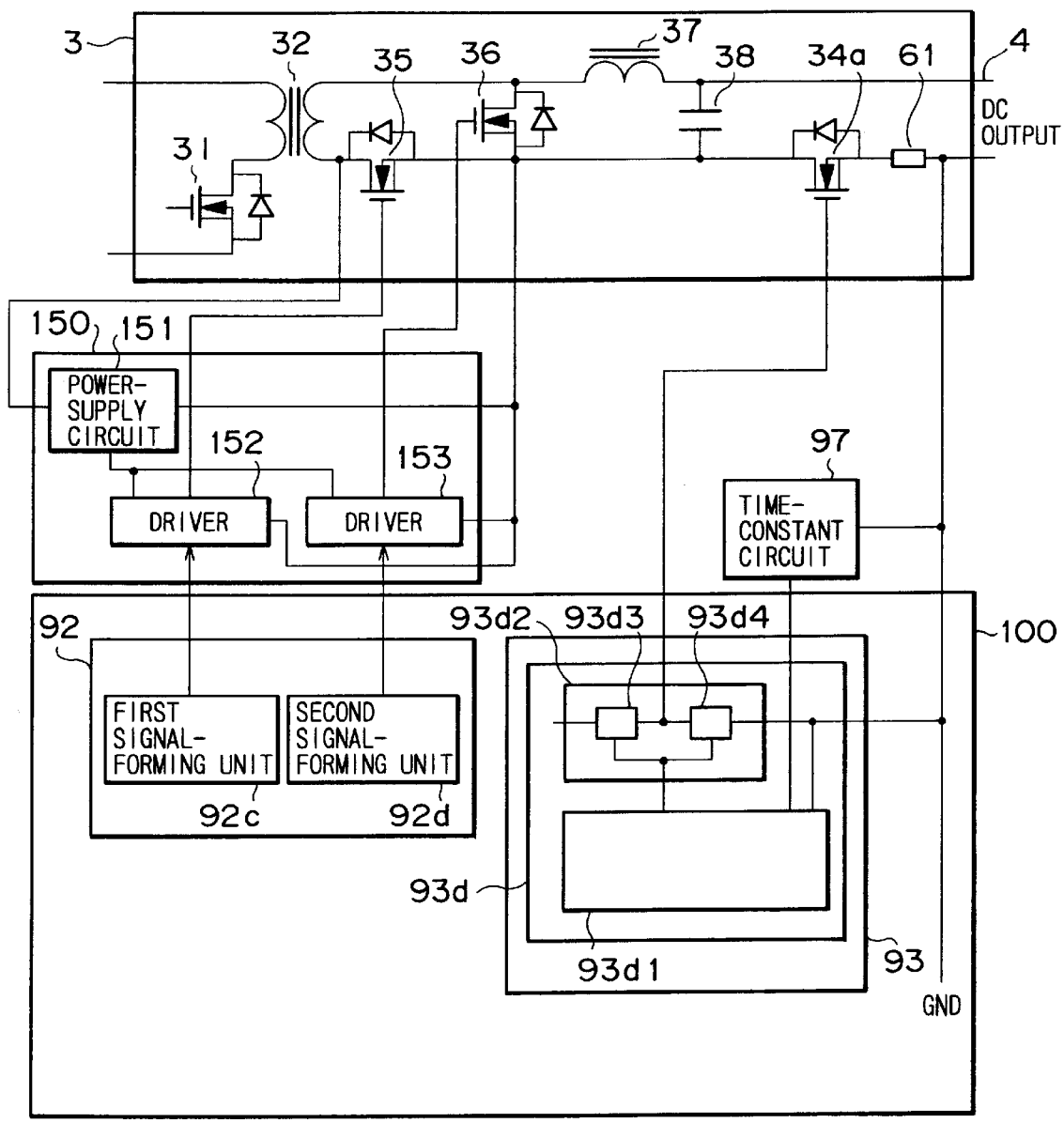
FIG. 9 is a diagram showing a sixth embodiment of the present invention.

FIG. 9 is a diagram showing a sixth embodiment of the present invention. The sixth embodiment is different from the third one in that, in the case of the sixth embodiment, a driving circuit 150 is provided for driving the synchronous-rectification circuit and the signal-forming unit 93d employed in the driving control unit 93 of the control circuit 100 includes a driving unit 93d2. The driving circuit 150 comprises a power-supply circuit 151 and two drivers 152 and 153. The power-supply circuit 151 detects a signal applied to the rectification device 35 or the current-circulation switch 36, generating a direct-current power. The driver 152 and the driver 153 receive signals generated by the first signal-forming unit 92c and the second signal-forming unit 92d respectively as well as a power from the power-supply circuit 151, driving the rectification device 35 and the current-circulation switch 36.

The signal-forming unit 93d includes the driving unit 93d2 and a driving-signal-generating unit 93d1 for generating a driving signal determined by a signal supplied by the on-command unit 93c and the time-constant circuit 97. The driving unit 93d2 receives a signal from the driving-signal-generating unit 93d1 to drive the reverse-current-blocking switch device. The driving unit 93d2 comprises a high-potential-side device 93d3 and a low-potential-side device 93d4 which is implemented by a depletion-type MOSFET.

In accordance with this embodiment, since the current for driving the switch device of the synchronous-rectification circuit is handled only inside the synchronous-rectification circuit, it is possible to prevent occurrence of a malfunction of the control circuit. Such a malfunction accompanies a driving current flowing in an operation to drive a device with a large capacity. In addition, the operation of the current-circulation switch device can be stabilized at an activation time. It should be noted that the feature of the sixth embodiment is also applicable to the configuration shown in FIG. 3 wherein the locations of the reverse-current-blocking switch device 34a and the common potential GND as well as the current compensation of the voltage compensation unit 74 are different from those of the fourth embodiment in addition to other differences as well as applicable to a control circuit not operating in a current mode.

Seventh Embodiment

Figure 10:
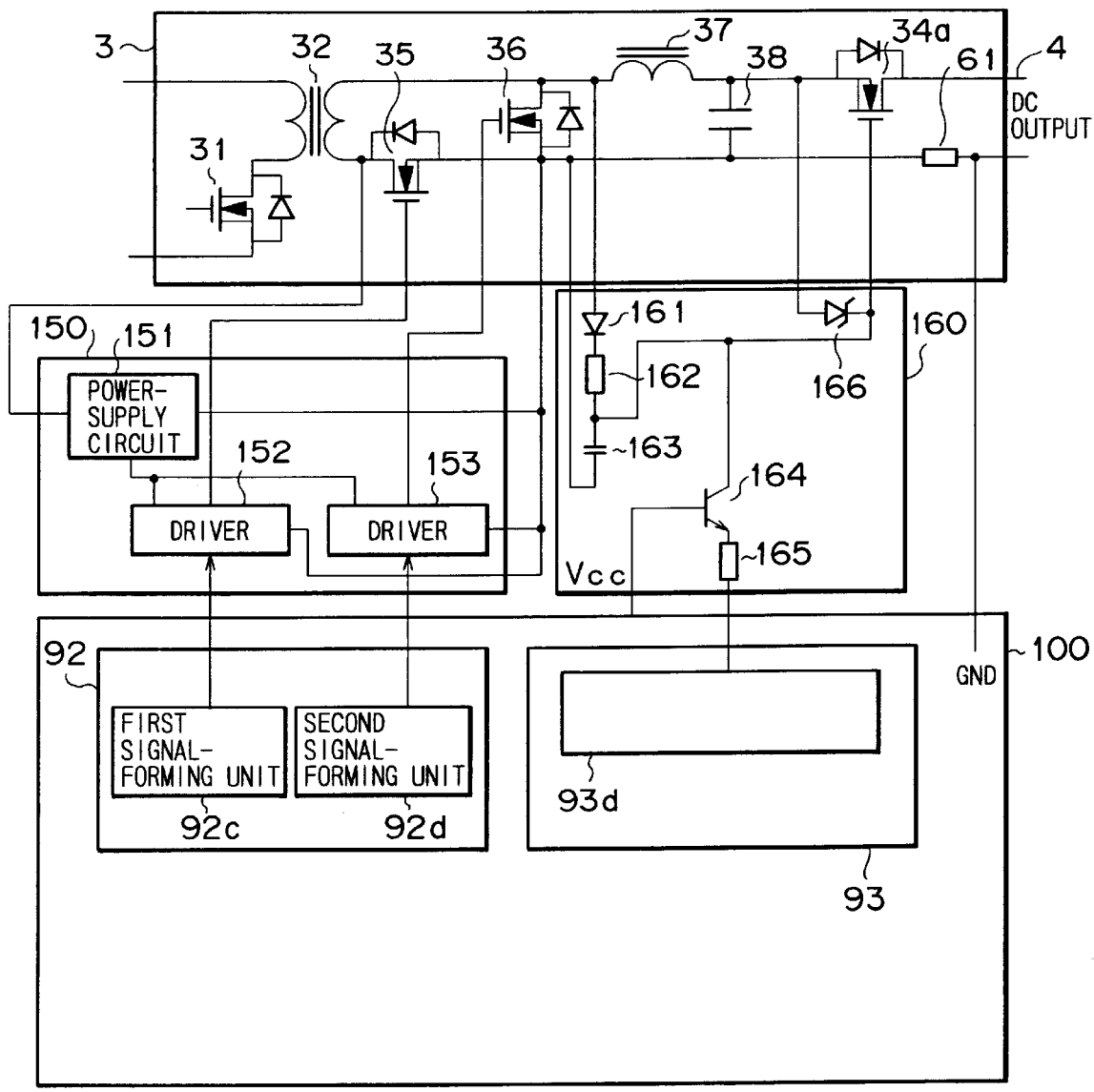
FIG. 10 is a diagram showing a seventh embodiment of the present invention.

FIG. 10 is a diagram showing a seventh embodiment of the present invention. The seventh embodiment is different from the sixth one in that, in the case of the seventh embodiment, the reverse-current-blocking switch device 34*a* is provided on the high-potential side of the output and there is provided a driving circuit 160 for driving the signal-forming unit 93*d* of the driving control unit 93 employed in the control circuit 100. The driving circuit 160 includes a series circuit comprising a diode 161, a resistor 162 and a capacitor 163. The series circuit is connected between the terminals of the current-circulation switch 36. The driving circuit 160 serves as a power supply connected to the output of the signal-forming unit 93*d* through a transistor 164 and a resistor 165. The base of the transistor 164 is connected to the power supply of the control circuit 100. The driving circuit 160 also includes a Zener diode 166 connected between the gate and the source of the reverse-current-blocking switch device 34*a*.

In accordance with this embodiment, since a current for driving the reverse-current-blocking switch device 34*a* is handled only inside the driving circuit 160, it is possible to prevent occurrence of a malfunction of the control circuit. Such a malfunction accompanies a driving current flowing in an operation to drive a device with a large capacity.

Eighth Embodiment

Figure 11:
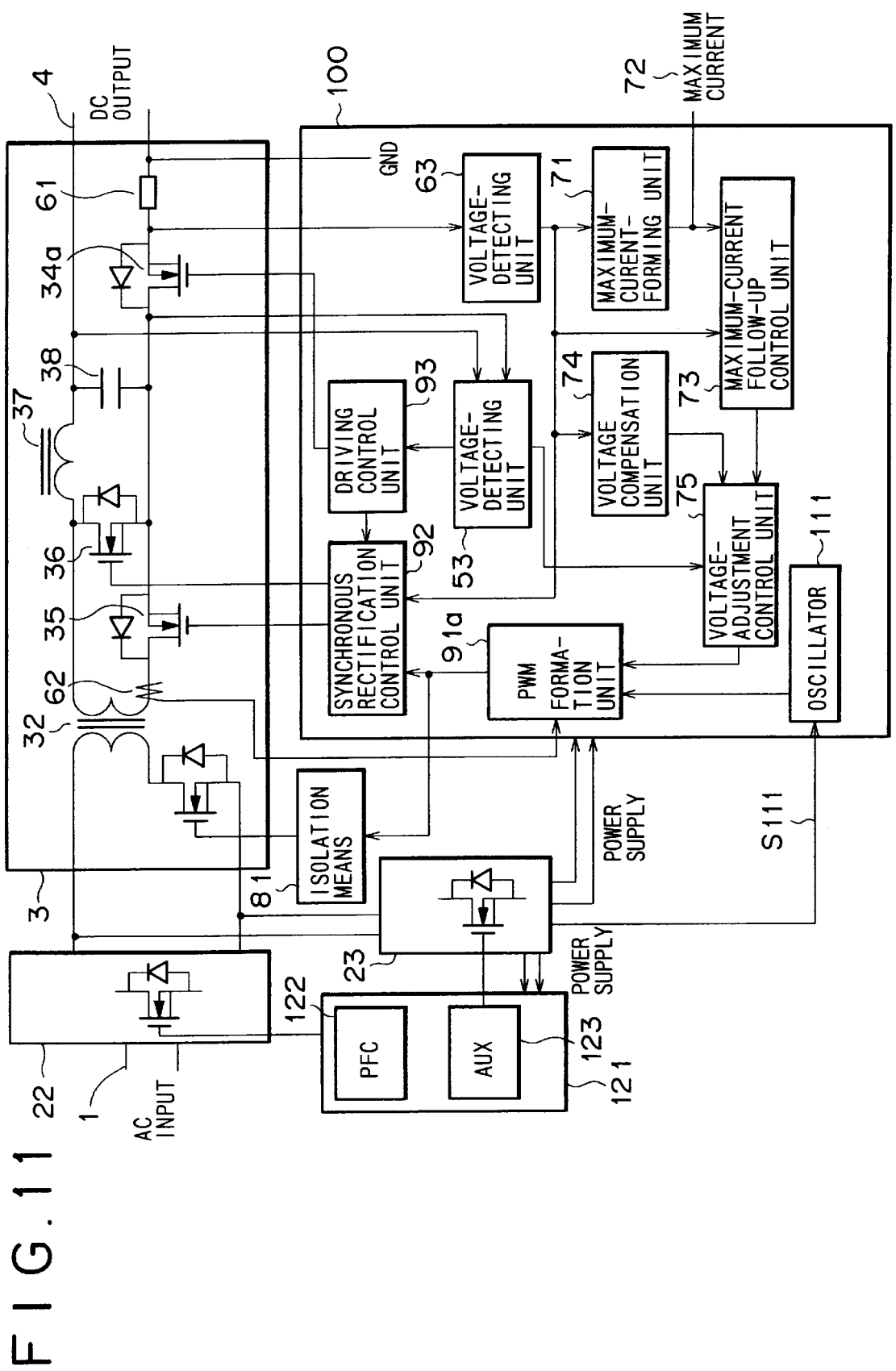
FIG. 11 is a diagram showing an eighth embodiment of the present invention.

FIG. 11 is a diagram showing an eighth embodiment of the present invention. The eighth embodiment is different from the third one shown in FIG. 1 in that the eighth embodiment includes an AC/DC converter 22 for converting an AC input 1 into a DC signal, an auxiliary switching converter 23 and a control circuit 121 and, in addition, the auxiliary switching converter 23 supplies a synchronization signal to the oscillator 111 and a power to the power supply of the control circuit 100. The AC/DC converter 22 and the auxiliary switching converter 23 are controlled by a PFC control means 122 and an AUX control means 123, which are employed in the control circuit 121. The auxiliary switching converter 23 not shown in detail in the figure receives the winding voltage of the transformer 32 and supplies a synchonization signal S111 to the oscillator 111. The auxiliary switching converter 23 rectifies the winding voltage, generating the power supplied to the power supply of the control circuit 100. It should be noted that the feature of the eighth embodiment shown in FIG. 11 can also be applied to the circuit shown in FIG. 8.

In accordance with this embodiment, the main switch device 31 employed in the switching converter 3 can be operated synchronously to the AC/DC converter 22. Thus, the power loss can be reduced.

It should be noted that, since the circuits of the embodiments described above do not require a signal-giving and taking isolation means between the circuits, the control circuit of each of the embodiment can be properly integrated on a single semiconductor chip. Such a semiconductor integrated circuit for power-supply applications allows the size and the cost of the power supply to be reduced.

What is claimed is:

1. A direct-current power-supply apparatus comprising a switching converter and a control circuit wherein:
    said switching converter comprises:
        a main switch device for generating a pulse voltage from a direct-current input;
        a synchronous-rectification circuit for converting said pulse voltage into a direct-current voltage;
        a reverse-current-blocking device for blocking a reverse current from a load; and
        an output terminal connected to the load through said reverse-current-blocking device;
    said control circuit is used for controlling said switching converter by detection of a voltage and a current, which are output by said switching converter, so as to set said output voltage at a predetermined level;
    said control circuit comprises:
        a maximum-current follow-up control unit for controlling a current to be borne by said switching converter in a parallel operation;
        a PWM formation unit for driving said main switch device employed in said switching converter;
        a synchronous-rectification control unit for generating a signal for driving said synchronous-rectification circuit; and
        a driving control unit for controlling an operation to drive said reverse-current-blocking switch device; and
    said maximum-current follow-up control unit, said PWM formation unit, said synchronous-rectification control unit and said driving control unit operate with an electric potential at said output terminal of the switching converter used as a reference electric potential.

2. A direct-current power-supply apparatus comprising a switching converter and a control circuit wherein:
    said switching converter comprises:
        a main switch device for generating a pulse voltage from a direct-current input;
        a synchronous-rectification circuit for converting said pulse voltage into a direct-current voltage;
        a reverse-current-blocking device for blocking a reverse current from a load; and
        an output terminal connected to the load through said reverse-current-blocking device;
    said control circuit is used for controlling said switching converter by detection of a voltage and a current, which are output by said switching converter, so as to set said output voltage at a predetermined level;
    said control circuit comprises:
        a maximum-current follow-up control unit for controlling a current to be borne by said switching converter in a parallel operation;
        a PWM formation unit for driving said main switch device employed in said switching converter;
        a synchronous-rectification control unit for generating a signal for driving said synchronous-rectification circuit; and
        a driving control unit controlling an operation to drive said reverse-current-blocking switch device; and
    said maximum-current follow-up control unit, said PWM formation unit, said synchronous-rectification control unit and said driving control unit operate with a common electric potential used as a reference electric potential, wherein:
        a rectification switch device of said synchronous rectification circuit and a low-potential-side terminal of a smoothing capacitor are connected to a low-potential side of said output terminal of said switching converter; and
        an electric potential appearing on said low-potential side of said output terminal and at least a voltage output by said smoothing capacitor are each taken in by said control circuit as a voltage signal.

3. A control circuit for controlling a switching converter by detection of a voltage and a current, which are output by said switching converter, so as to set said output voltage at a predetermined level wherein:

said switching converter comprises:
a main switch device for generating a pulse voltage from a direct-current input;
a synchronous-rectification circuit for converting said pulse voltage into a direct-current voltage;
a reverse-current-blocking device for blocking a reverse current from a load; and
an output terminal connected to the load through said reverse-current-blocking device;
said control circuit comprises:
a maximum-current follow-up control unit for controlling a current to be borne by said switching converter in a parallel operation;
a PWM formation unit for driving said main switch device employed in said switching converter;
a synchronous-rectification control unit for generating a signal for driving said synchronous-rectification circuit; and
a driving control unit for controlling an operation to drive said reverse-current-blocking switch device; and
said maximum-current follow-up control unit, said PWM formation unit, said synchronous-rectification control unit and said driving control unit operate with an electric potential at said output terminal of the switching converter used as a reference electric potential.

4. A control circuit according to claim 3, further comprising:
a maximum-current-forming unit for selecting and outputting a maximum current among currents output by said switching converter in a parallel operation;
wherein said maximum-current follow-up control unit controls said output current to a value following said maximum current;
a voltage-detecting unit for detecting said voltage output by said switching converter;
a voltage-adjusting unit for controlling said PWM formation unit in accordance with signals output by said maximum-current follow-up control unit, said voltage compensation unit and said voltage-detecting unit so as to adjust said voltage output by said switching converter to a predetermined level;
a voltage compensation unit for compensating said switching converter for a voltage drop inside said switching converter in accordance with an output current;
wherein said PWM formation unit turns said main switch device on and off;
wherein said synchronous-rectification control unit drives said synchronous-rectification circuit in accordance with a signal output by said PWM formation unit; and
wherein said driving control unit drives said reverse-current-blocking switch device in accordance with a signal output by said voltage-detecting unit.

5. A control circuit according to claim 3 or 4 wherein said synchronous-rectification control unit generates a driving signal according to a signal output by said PWM formation unit when said current output by said switching converter exceeds a predetermined value.

6. A control circuit according to claim 3 or 4 wherein said synchronous-rectification control unit generates a driving signal after driving said reverse-current-blocking switch.

7. A control circuit according to claim 4 wherein:
said voltage-detecting unit comprises an output-voltage unit and a switch-voltage unit;
said output-voltage unit separates and detects said voltage output by said switching converter and drives said voltage-adjusting unit to adjust said voltage output by said switching converter to said predetermined level;
said switch-voltage unit separates and detects a voltage of said reverse-current-blocking switch device and outputs an on-enable signal of the switch device when said detected voltage goes below a predetermined level;
said driving control unit comprises an operation-detecting unit, a polarity-detecting unit, an on-command unit and a signal-forming unit;
said operation-detecting unit generates an on-enable signal when said PWM formation unit operates;
said polarity-detecting unit generates an on-enable signal when said current output by said switching converter has a non-negative polarity;
said on-command unit generates an on command and supplies said on command to said signal-forming unit when said switch-voltage unit, said operation-detecting unit and said polarity-detecting unit output said respective on-enable signals to said on-command unit; and
when said signal-forming unit receives said on command, said signal-forming unit generates a signal for driving said reverse-current-blocking switch device with a build-up characteristic having a time constant determined by a time-constant circuit.

8. A control circuit according to claim 3 or 4, said control circuit further having a pulse-width-forming unit, a level-detecting unit, a first signal-forming unit and a second signal-forming unit wherein:
said pulse-width-forming unit generates a signal for driving said synchronous-rectification switch device in accordance with a signal output by said PWM formation unit;
said level-detecting unit outputs a driving-enable signal to a current-circulation switch device when said current output by said switching converter exceeds a predetermined magnitude;
said first signal-forming unit generates a signal for driving said rectification switch device in accordance with a signal output by said pulse-width-forming unit and a signal output by said driving control unit; and
said second signal-forming unit generates a signal for driving said current-circulation switch device in accordance with signals output by said pulse-width-forming unit and said level-detecting unit and a signal output by said driving control unit.

9. A control circuit according to claim 4, further comprising an oscillator which is capable of operating synchronously with an external signal and used for controlling an operating frequency of said PWM formation unit.

10. A direct-current power-supply apparatus according to claim 3 wherein said synchronous-rectification circuit includes a rectification switch device, and wherein said control circuit takes in a voltage of said rectification switch device as a voltage signal.

11. A control circuit according to claim 3, wherein said synchronous-rectification circuit includes a rectification switch device, the control circuit further comprising a voltage-to-current conversion unit for taking in voltage of said rectification switch device as a voltage signal and for converting said voltage signal received from said rectification switch device into a current signal in accordance with a driving signal of said rectification switch device.

12. A control circuit according to claim 9 wherein said level-detecting unit receives a voltage applied to said rectification switch device employed in said synchronous-rectification circuit and, when said voltage goes below a predetermined level, said level-detecting unit outputs a drive-enable signal.

13. A control circuit according to claim 7 wherein said signal-forming unit employed in said driving control unit is implemented by a depletion-type MOSFET device provided on a low-potential side of a driving-signal-forming unit.

14. A direct-current power-supply apparatus according to claim 2 wherein said synchronous rectification circuit includes a current-circulation switch device and a rectification switch device, where said control circuit includes a driver of said current-circulation switch device and a driver of said rectification switch device, and wherein a power is received from an applied voltage of said current circulation switch device or said rectification switch device and passed on to said drivers.

15. A semiconductor integrated circuit device for power supply comprising said control circuit according to claim 3 or 4 formed on a single semiconductor chip.

16. A control circuit according to claim 3 or 4 wherein a power and a synchonization signal are supplied from an auxiliary switching converter.

* * * * *